(12) United States Patent
Jilani et al.

(10) Patent No.: US 11,791,492 B2
(45) Date of Patent: Oct. 17, 2023

(54) FUEL CELL STACK

(71) Applicants: AUDI AG, Ingolstadt (DE); Volkswagen AG, Wolfsburg (DE)

(72) Inventors: Adel Jilani, Burnaby (CA); Siva Sankar Voosani Krishna, Burnaby (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 472 days.

(21) Appl. No.: 17/254,763

(22) PCT Filed: May 10, 2019

(86) PCT No.: PCT/EP2019/062008
§ 371 (c)(1),
(2) Date: Dec. 21, 2020

(87) PCT Pub. No.: WO2019/242931
PCT Pub. Date: Dec. 26, 2019

(65) Prior Publication Data
US 2021/0273253 A1 Sep. 2, 2021

(30) Foreign Application Priority Data
Jun. 22, 2018 (DE) .................. 10 2018 210 176

(51) Int. Cl.
*H01M 8/248* (2016.01)
(52) U.S. Cl.
CPC ........ *H01M 8/248* (2013.01); *H01M 2250/20* (2013.01)

(58) Field of Classification Search
CPC ............... H01M 8/248; H01M 8/1004; H01M 2008/1095; H01M 2250/20; H01M 8/04; Y02E 60/50
See application file for complete search history.

(56) References Cited

U.S. PATENT DOCUMENTS

| 6,413,665 B1* | 7/2002 | Blanchet ............... H01M 8/248 429/511 |
| 2004/0121216 A1* | 6/2004 | Blanchet ............... H01M 8/248 429/470 |
| 2008/0102345 A1* | 5/2008 | Andreas-Schott .. H01M 8/2475 429/511 |

(Continued)

FOREIGN PATENT DOCUMENTS

| DE | 10 2008 026 858 A1 | 12/2008 |
| DE | 10 2010 007 979 A1 | 8/2011 |

(Continued)

*Primary Examiner* — Muhammad S Siddiquee
(74) *Attorney, Agent, or Firm* — SEED INTELLECTUAL PROPERTY LAW GROUP LLP

(57) ABSTRACT

A fuel cell stack is provided comprising a first end plate and a second end plate between which a plurality of fuel cells is arranged. At least one elastic tensioning element is tensioned in the stack direction between the end plates. Furthermore, the fuel cell stack has at least one rotatably mounted mounting shaft. At least one end section of at least one tensioning element is fixed to the rotating mounting shaft. Moreover, the rotatable mounting shaft is connected to the fuel cell stack via a tensioned torsion spring. The torsion spring brings about an automatic retensioning of the tensioning element.

11 Claims, 5 Drawing Sheets

(56) References Cited

U.S. PATENT DOCUMENTS

| | | | | |
|---|---|---|---|---|
| 2008/0311457 A1* | 12/2008 | Andreas-Schott | .. | H01M 8/2483 |
| | | | | 429/513 |
| 2009/0029232 A1* | 1/2009 | Petty | ..................... | H01M 8/248 |
| | | | | 29/592.1 |
| 2009/0280359 A1 | 11/2009 | Bogumil et al. | | |
| 2011/0217617 A1* | 9/2011 | Andreas-Schott | .... | H01M 8/248 |
| | | | | 429/465 |
| 2011/0244355 A1* | 10/2011 | Skala | .................. | H01M 8/2475 |
| | | | | 429/468 |
| 2011/0294030 A1* | 12/2011 | Yamamoto | ............ | H01M 8/247 |
| | | | | 429/465 |

FOREIGN PATENT DOCUMENTS

| | | |
|---|---|---|
| DE | 10 2010 007 981 A1 | 8/2011 |
| DE | 10 2012 000 266 A1 | 7/2013 |
| EP | 1 753 065 A1 | 2/2007 |
| EP | 1 870 952 A2 | 12/2007 |
| JP | H06-13101 A | 1/1994 |
| WO | 2011/098276 A1 | 8/2011 |
| WO | 2012/065890 A1 | 5/2012 |

* cited by examiner (A) (B)

FUEL CELL STACK

BACKGROUND

Technical Field

The disclosure relates to fuel cells and vehicles comprising fuel cells.

Description of the Related Art

Fuel cells use the chemical conversion of a fuel with oxygen to water for the creation of electrical energy. For this purpose, fuel cells have a membrane electrode assembly (MEA) with a membrane electrode unit.

The membrane electrode unit is formed by a proton exchange membrane, PEM, upon which catalytic electrodes are arranged on both sides. In this manner, the membrane separates the anode chamber assigned to the anode and the cathode chamber assigned to the cathode from one another and electrically insulates the same. Gas diffusion layers can be arranged on the sides of the electrodes not facing the membrane.

During operation of the fuel cells, a hydrogen-containing fuel is supplied to the anode, upon which an electrochemical oxidation from $H_2$ to $H^+$ occurs with release of electrons. A water-bound or anhydrous transport of the $H^+$ protons from the anode chamber to the cathode chamber occurs via the electrolytic membrane. The electrons made available on the anode are supplied via an electrical line of the cathode.

The cathode is provided with an oxygen-containing operating medium, such that a reduction from $O_2$ to $O_2^-$ takes place there upon uptake of the electrons. These oxygen anions react in the cathode chamber with the protons transported through the membrane, with formation of water.

A fuel cell stack is generally formed by a plurality of MEAs which are arranged in a stack in a stack direction, the electrical power of which is added up. Bipolar plates, which ensure a supply of reactants and coolant to the individual MEAs, and which act as an electrically conductive contact with the membrane electrode assemblies, are generally arranged between the membrane electrode assemblies.

Seals are arranged between the membrane electrode units and the bipolar plates, so as to seal off the anode and cathode chambers from the outside and to prevent the outflow of the operating medium from the stack. These seals are provided on the membrane electrode units, the bipolar plates, or on both of these components.

For permanent sealing of the stack, and to ensure the electrical contact between the bipolar plates and the membrane electrode assemblies, the fuel cell stack is pressed prior to being put into operation. Furthermore, tensile elements are used to also press the fuel cell stack during operation.

Various tensioning elements are known from the state of the art. For example, two end plates arranged at the ends of the fuel cell stack can be connected by means of tensile elements. The fuel cell stack is pressed together through the introduction of tensile forces, via the tensile elements, to the end plates. Threaded rods, tension rods, chains, or the like can, for example, be used as tensile elements.

The use of stretched strips or band-shaped elastic tensioning elements, which are either connected with the end plates or at least partially run around a cross-section (in the stack direction), is also known. Reference is made, for example, to EP 1 870 952 A2, DE 10 2012 000 266 A1 and WO 2012/065890 A1, the content of which is referred to in its entirety here, as regards the design and attachment possibilities of such elastic tensioning elements (tensile elements). A retensioning of the elastic band elements is however generally not provided for.

It is possible, in particular in the active areas of the fuel cell stack or alternatively of the MEAS, that there are operationally related variations in height, which can, for example, vary with the temperature and moisture content of the fuel cell stack. It is also said that the stack breathes. In the case of elastic tensioning elements, it is possible that the elasticity of this tensioning element can decrease over time. In particular, in the case of metallic tensioning elements which run around the fuel cell stack in a ring shape and thereby have multiple obvious kinks, this leads to the elongation of the tensioning element, in particular in the area of these kinks.

No matter the variations in height of the fuel cell stack and the aging of the tensioning element, a sufficient compression of the stack must always be ensured, in particular to guarantee the sealing effect of the seals that are employed. Means, with which will be attempted to permanently ensure the compression of a fuel cell stack, are already known from the state of the art.

DE 10 2010 007 979 A1 discloses a fuel cell stack with fuel cells arranged between two end plates and at least one tensioning means, attached to the end plate, to exert tensile force. A friction-reducing means of deflection is arranged between the tensioning means and at least one of the end plates. A variation in height of the stack should be compensated by a compressed spring element arranged between one end plate and one compression plate.

According to this state of the art, tension spikes based on the expansion of the stack should be avoided by means of elastic elements. An initial over-tensioning of the elastic elements should even be able to partially avoid a variation in height of the stack. The elastic elements are however themselves subject to aging and therefore this passive option for the adjustment of the compression force is, to this extent, disadvantageous.

DE 10 2010 007 981 A1 discloses a fuel cell stack with fuel cells arranged between two end plates and at least one means of tensioning connecting the end plates for the exertion of tensile force. A fastening element, which is designed as an eccentric element or which comprises an eccentric element, is arranged between the means of tensioning and at least one of the end plates. By rotating the fastening element, a distance between the end plates should be modified and thereby a tensile force between the end plates is adjusted. The compression system according to this state of the art has a complicated construction which requires specially adapted end plates and/or means of tensioning and is not suitable for surrounding tensioning elements.

In the case of other solutions, with compressed spring elements arranged between the end plates and other stack components, for example, compression plates, depressions able to accept the spring elements are generally provided in the end plates. Additional installation space in the fuel cell stack is required for this purpose. Furthermore, the associated local weakening of the end plates increases their tendency to deflect or be damaged under the action of compressive or tensile forces.

BRIEF SUMMARY

Embodiments of the invention are thus based on the task of overcoming the disadvantages of the state of the art and providing a solution for permanent compression of fuel cell stacks which can be integrated in a space-saving manner into existing fuel cell stacks, and also safely ensures the preservation of a compressive tensile force over an extended period of time.

This task is solved by a fuel cell stack with a first end plate and a second end plate and a plurality of fuel cells arranged in the stack direction between the two end plates. Furthermore, the fuel cell stack has at least one elastic tensioning element stretched between the end plates in the stack direction. At least one tensioning element is arranged, in sections, between a surface section of the fuel cell stack and a retensioning element.

The fuel cell stack furthermore has at least one rotatable mounting shaft. The mounting shaft may be integrated in the fuel cell stack and rotatable in or on the fuel cell stack. At least one end section, in particular one first end section, of at least one tensioning element is fixed to the mounting shaft. The end section may be firmly bonded and/or frictionally and/or positively fixed to the mounting shaft, in order to prevent relative movements between the end section and the mounting shaft.

The rotatable mounting shaft is connected to the fuel cell stack at least via one tensioned torsion spring. In other words, the torsion spring is fixed to the mounting shaft and additionally to the fuel cell stack. A first end of the torsion spring, for example, a first end of a wire coiled around the spring, may be fastened to the mounting shaft and a second end of the torsion spring, for example, a second end of the wire coiled to the spring, is fastened to the fuel cell stack. In this manner, the spring tension, or alternatively the torque of the tensioned torsion spring is transmitted to the rotatable mounting shaft. The torsion spring may be connected with the mounting shaft in such a way that a torque exerted by the spring is opposed by the tensile stress exerted by the tensioning element.

By fixing the end section of at least one tensioning element to the mounting shaft, the tensile stress of the at least one tensioning element can be adjusted by rotating the mounting shaft. The mounting shaft thus allows the at least one tensioning element to be retensioned by rotating the mounting shaft. The arrangement of the tensioned torsion spring between the mounting shaft and the fuel cell stack transmits a directed torque to the mounting shaft which is opposite to the tensile stress of the tensioning element. When the tensile stress of the tensioning element is reduced, for example, due to age-related elongation of the tensioning element, the spring is retensioned by means of the torque of the torsion spring.

The fuel cell stack is thus equipped to ensure compression of the fuel cell stack via the end plates tensioned by means of the tensioning elements, even over an extended period of time. The automatic retensioning of an elongated tensioning element by winding the tensioning element onto the mounting shaft by means of potential energy stored in at least one torsion spring is particularly advantageous. Winding is only performed if the tensile stress of the tensioning element falls below the torque of the torsion spring. By rotating the mounting shaft in a first direction of rotation, the at least one tensioning element is effectively shortened between its end sections, thereby increasing the tensile force generated by it.

Furthermore, it is advantageous that the fuel cell stack is designed to unwind a tensioning element from the mounting shaft by rotating the mounting shaft in a second, opposite direction of rotation. Rotating in the second direction of rotation is done in the direction of the tensile stress of the tensioning element and thus against a torque exerted by the torsion spring. This means that unwinding only takes place if the tensile stress exceeds the torque. Turning in the second direction of rotation effectively lengthens the tensioning element between its fixed points and thus reduces the tensile force generated by it. With the fuel cell stack, it can thus be prevented that a compression tensile force generated by the tensioning elements exceeds a certain threshold value determined by the torque of at least one torsion spring. Damage to stack components, e.g., porous ceramic layers, can thereby reliably be prevented by slackening the tensioning elements in the event of an operationally induced increase in the stack height of the fuel cell stack.

A second end section of the at least one tensioning element may also be fixed to the fuel cell stack. The second end section is different from the first end section and each tensioning element has a first and a second end section. The second end section may be fixed to the same mounting shaft as the first end section. Turning the mounting shaft therefore results in twice as great a shortening of the shaft and thus in an increase in tensile force compared to only one fixed end section. Alternatively, the second end section of the tensioning element may be fixed to a further mounting shaft. The other mounting shaft may also be connected to the fuel cell stack via at least one tensioned torsion spring. This means that the tensioning element can be retensioned on both sides and thus in a particular uniform and precise manner. The second end section may also be firmly fixed to any other section of the fuel cell stack. This represents a particularly simple embodiment.

The elastic tensioning element of the fuel cell stack may be tensioned in a range according to Hooke's law. Retensioning of the tensioning element may take place in the stack direction (S) of the fuel cell stack and along the tensioning direction of the tensioning elements. The spring force of the at least one torsion spring and thus the tension of the at least one tensioning element can be adjusted by rotating the mounting shaft. The stack compression may also be adjusted locally by arranging tensioned torsion springs of determined spring force.

The at least one tensioning element, or each tensioning element of the fuel cell stack, may be tensioned by a plurality of torsion springs connected to the at least one mounting shaft. For this purpose, the at least one tensioning element is fixed to a mounting shaft and the plurality of tensioned torsion springs is fixed to this mounting shaft and the fuel cell stack. The spring forces applied by the plurality of torsion springs thus are summed for a total spring force. This means that even large tensile compression stresses generated by the tensioning elements can be ensured by the torsion springs.

In an embodiment, the at least one mounting shaft runs along an edge area of the first or second end plate. The edge area of this end plate may define a transition from a first surface of the end plate facing outwards and a second surface of the end plate perpendicular to the first surface. The second surface may extend along the stack direction of the fuel cell stack or has a normal vector perpendicular to the stack direction. In this embodiment, the tensioning elements do not extend over the edges of the fuel cell stack. According to this embodiment, the at least one mounting shaft is also connected to the end plate via the at least one tensioned torsion spring, along whose edge area it runs. A fuel cell stack can thus benefit from the advantages of the embodiments described herein simply by adding appropriately equipped end plates.

The mounting shaft in the area of an edge area of the end plate may be guided through the end plate in sections. In the case of a cylindrical mounting shaft, the end plate in this embodiment may have a cylindrical bore. A simple rotatable mounting of the mounting shaft is hereby advantageously achievable. Furthermore, the end plate in this embodiment has recesses or set-backs of the edge area, where the mounting shaft is exposed. The at least one tensioning element in the area of the recess may be attached to the mounting shaft. This simplifies the winding up of the tensioning element onto the mounting shaft. The at least one torsion spring in the recess may also be connected to the mounting shaft and may also be connected to the end plate.

In a further embodiment, the at least one torsion spring is a coil spring, such as a coil spring spirally wound from wire or spring steel. Another type of torsion spring is a torsion rod spring or a torsion bar. Furthermore, such a torsion rod spring may be designed integral with the mounting shaft, for example as a section of the torsion rod spring connected to the fuel cell stack, such as an end plate. The torsion spring may also be designed as a hollow machined spring. The torsion spring may be machined from a hollow cylinder made of spring steel. Such machined hollow springs allow a particularly precise setting of the spring force, in particular over extended periods of time.

The connection between torsion spring and mounting shaft or alternatively torsion spring and fuel cell stack can be realized in many different ways. For example, the torsion spring is flanged to the fuel cell stack, such as to an end plate. The mounting shaft can also have a projecting flange area for fixing the torsion spring. Alternatively, the torsion spring is permanently connected to the mounting shaft, for example, by welding. Furthermore, the torsion spring may be connected to the fuel cell stack and/or the mounting shaft by means of a positive fit, e.g., via bayonet connection elements. Such connecting elements may be designed to be self-locking, taking into account, in particular, the direction of effect of the spring force of the torsion spring.

In another embodiment of the fuel cell stack, the at least one mounting shaft has a longitudinally extended radial groove. This may extend parallel to an axis of rotation of the mounting shaft. The radial groove may be designed to accommodate the end section of the at least one tensioning element. In other words, the end section of the tensioning element is inserted into the radial groove. Furthermore, the end section may be fixed in the radial groove, for example, firmly bonded and/or frictionally and/or positively locked.

In another embodiment, the fuel cell stack also has at least one electric motor that is designed to drive the at least one mounting shaft by electric motor. In other words, the at least one mounting shaft is rotatable by means of an electric motor. The motor may allow the mounting shaft to rotate in a first direction of rotation, and such as in a first and an opposite second direction of rotation. This embodiment allows the automatic retensioning of the at least one torsion spring that is firmly connected to the mounting shaft. Thus, a loss of tension due to aging can be counteracted by the torsion springs themselves.

The fuel cell stack may have at least one sensor which is designed to detect a tensile force exerted by at least one tensioning element and/or the spring force exerted by at least one torsion spring. The sensor may detect a compressive tensile force exerted on the entire stack and may be arranged for this purpose, for example, as a sensor cell between the stacked fuel cells. Alternatively, the sensor may detect the tensile force exerted by one specific tensioning element and/or the spring force exerted by one specific torsion spring. For example, such a sensor is designed as a strain gauge. A sensor, in particular a strain gauge, may be arranged on each tensioning element.

The use of such sensors in the fuel cell stack allows the measurement of collective or individual changes in length of the tensioning elements. A tensile force or change in tensile force of the respective tensioning element may be determined on the basis of the change in length of the tensioning element. This allows conclusions to be drawn that one or more torsion springs are no longer sufficiently tensioned to compensate for the loss of tensile stress. By retensioning the springs, they can once again counteract a change in tensile force of the at least one tensioning element. It is also possible to determine whether a torsion spring needs to be retensioned on the basis of measured values from sensors for recording the spring force exerted by a torsion spring.

Furthermore, the fuel cell stack may have at least one control unit which is connected to the at least one sensor and is designed to operate the at least one electric motor. The control unit may be designed to receive a sensor signal from the at least one sensor. Furthermore, the control unit is designed to output a control signal to the at least one electric motor. The embodiment enables an automated retensioning of the torsion springs on the basis of sensor values for the tensile force of the tensioning elements and/or based on sensor values for the tensile force of the torsion springs.

In an embodiment, the fuel cell stack has a plurality of tensioning elements and a plurality of mounting shafts. Each mounting shaft is connected to the fuel cell stack with one or more tensioned torsion springs and one or more tensioning elements are fixed to each mounting shaft. Furthermore, the fuel cell stack may have a plurality of electric motors designed to drive at least one of the mounting shafts.

This embodiment allows a verification of tensile stress of individual groups of tensioning elements or even single tensioning elements. For this purpose, it is essential that different tensioning elements are fixed to different mounting shafts. The mounting shafts may be rotated by a common electric motor. For example, two mounting shafts can be driven by a motor arranged centrally between these shafts. Several tensioning elements may be connected to a common motor in a controllable, friction-locked manner via respective couplings. Furthermore, the fuel cell stack of this embodiment may have a plurality of sensors set up to measure the tensile stress of the tensioning elements.

Furthermore, the at least one mounting shaft may have at least one ratchet wheel and at least one pawl engaging with the ratchet wheel. The principle of a ratchet may therefore be used to allow the mounting shaft to rotate in one direction only. In this way the stress on the torsion springs can be relieved and the bearings of the electric motors can be protected. This embodiment can be combined with the use of a single motor for a plurality of mounting shafts.

In another embodiment of the fuel cell stack, at least one of the first end plate and the second end plate is segmented. At least one tensioning element may extend over each of these segments. Each end plate segment may have an individual mounting shaft which is connected to the fuel cell stack, such as the respective end plate segment, via at least one torsion spring independently of the other mounting shafts. The resulting decoupling of the individual tensioning elements allows local variation of the stack compression.

The tensioning element may be an elastic tensioning element known from the state of the art, which is fastened to the end plates of the fuel cell stack or substantially runs completely around the fuel cell stack (in other words in a ring-shaped manner) in at least one cross-section along the stack direction.

The tensioning element, at least in sections, may lie flat against a surface of the fuel cell stack. Alternatively, the tensioning element is at least in sections spaced apart from the fuel cell stack. For example, the end plates protrude laterally beyond the fuel cells so that the tensioning element is at a distance from the side walls of the fuel cells. Alternatively, spacers mounted on the end plates are used to create a distance between one or a plurality of tensioning elements and one or both end plates.

The tensioning element may be designed as a band or strip-shaped flexible and/or elastic tensioning element, as is, for example, known from EP 1 870 952 A2. The tensioning element may consist of an elastic plastic, an elastic polymer (i.e., nylon) or an elastic metal, and under standard conditions has a modulus of elasticity >1 GPa, such as >5 GPa along the tensioning direction.

Furthermore, an end section of the tensioning element may be firmly bonded and/or fixed by means of at least one means of tensioning to at least one stack end plate. In order to ensure easy disassembly of the fuel cell stack, the tensioning element may be detachably fixed to at least one end plate of the stack. The tensioning element may be engaged into the end plate. For this purpose, the end plate may have at least one hook for engaging the tensioning element on one of its side faces or on its outwardly-facing surface in the direction of the stack. The tensioning element may have at least one engagement opening for engagement on an engaging hook. The other end section of the tensioning elements is then fixed to the mounting shaft.

Alternatively, the at least one tensioning element stretches, at least substantially, around a circumference of the fuel cell stack in a cross-section in the stack direction. In this case, a tensioning element is fixed at least at one of its end areas to another end area of the same tensioning element or to another tensioning element. The tensioning element can thus be designed to be closed in a ring shape. The end sections do not butt up to one another, but rather run parallel along each other, so that both end sections point in the same direction. The end sections connected in this way are then fixed together on a mounting shaft and enable particularly efficient winding and unwinding.

In another embodiment, a means of deflection is arranged in at least one edge area of the fuel cell stack tensioned by the at least one tensioning element. A means of deflection may be arranged in at least one edge area of the first end plate and/or the second end plate tensioned by the at least one tensioning element. The means of deflection is designed, in particular, to reduce friction between the tensioning element and the edge area. This friction reduction enables the stack tension to be repeatedly and finely adjusted by means of the variably fixable distance between the retensioning element and the stack.

The means of deflection may be a surface with low sliding friction, for example, by means of a suitable coating. The means of deflection may also be a deflection pulley. The means of deflection may be arranged in at least one of the end plates. For further details on the design of the means of deflection, full reference is hereby made to DE 10 2010 007 979 A1.

All edge areas of the end plates may be provided with deflection pulleys, whereby at least some of the deflection pulleys are equipped as mounting shafts with means for fixing an end section of a tensioning element. At least these deflection pulleys (mounting shafts) may be connected to the fuel cell stack via tensioned torsion springs.

A further subject matter is a vehicle, in particular an electric-motor-driven vehicle with a fuel cell stack as described above. The fuel cell stack serves in particular to supply an electric motor of the vehicle.

The various embodiments mentioned in this application can be combined with each other, unless otherwise stated in the individual case.

BRIEF DESCRIPTION OF THE SEVERAL VIEWS OF THE DRAWINGS

Embodiments of the invention will be further explained with reference to the drawings, wherein.

DETAILED DESCRIPTION

Figure 1:
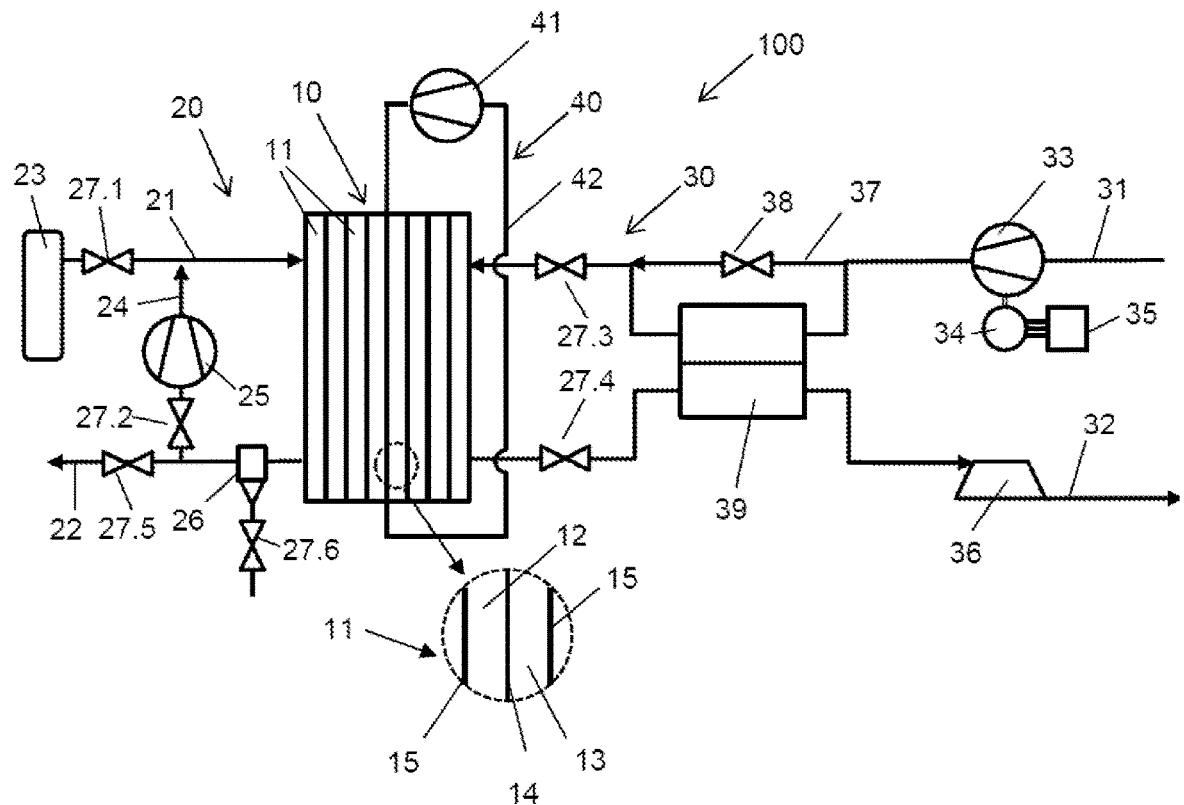
FIG. 1 shows a schematic view of a fuel cell system.

FIG. 1 shows a state-of-the-art fuel cell system designated 100. The fuel cell system 100 is part of a vehicle that is not further represented, in particular, an electric vehicle, which has an electric traction motor that is supplied with electrical energy by the fuel cell system 100.

The fuel cell system 100 comprises, as the core component, a fuel cell stack 10, which has a plurality of individual cells 11 arranged in stack form, which are formed by alternately stacked membrane electrode assemblies (MEA) 14 and bipolar plates 15 (see detailed section). Each individual cell 11 thus comprises a MEA 14 with an ion-conductive polymer electrolyte membrane (not shown in detail here) as well as catalytic electrodes arranged on both sides thereof. These electrodes catalyze the respective partial reaction of the conversion of the fuel. The anode and cathode electrodes are designed as a coating on the membrane and have a catalytic material, for example, platinum, which is supported on an electrically conductive carrier material with a large specific surface area, for example, a carbon-based material.

As shown in the detailed illustration in FIG. 1, an anode chamber 12 is formed between a bipolar plate 15 and the anode, and the cathode chamber 13 is formed between the cathode and the next bipolar plate 15. The bipolar plates 15 are used to feed the operating fluids into the anode and cathode chambers 12, 13 and moreover establish the electrical connection between the individual fuel cells 11. Optionally, gas diffusion layers can be arranged between the membrane electrode assemblies 14 and the bipolar plates 15.

In order to supply the fuel cell stack 10 with operating resources, the fuel cell system 100 has an anode supply 20 on the one side and a cathode supply 30 on the other side.

The anode supply 20 of the fuel cell system 100 shown in FIG. 1 comprises an anode supply path 21, which serves to supply an anode operating resource (the fuel), for example, hydrogen, to the anode chambers 12 of the fuel cell stack 10. For this purpose, the anode supply path 21 connects a fuel storage 23 with an anode inlet of the fuel cell stack 10. The setting of the feed pressure of the anode operating resource into the anode chambers 12 of the fuel cell stack 10 is carried out via a metering valve 27.1. The anode supply 20 further comprises an anode off-gas path 22, which discharges the anode off-gas from the anode chambers 12 via an anode outlet of the fuel cell stack 10.

In addition, the anode supply 20 of the fuel cell system 100 shown in FIG. 1 has a recirculation line 24 which connects the anode off-gas path 22 with the anode supply path 21. Recirculation of fuel is common in order to return the fuel that was used overstiochiometrically to the fuel cell stack 10. A recirculation enhancement system 25, such as a recirculation blower, as well as a flap valve 27.2 may be arranged in the recirculation line 24.

In addition, a water separator 26 is built into the anode supply 22 of the fuel cell system to remove the product water resulting from the fuel cell reaction. A drain of the water separator can be connected to the cathode off-gas line 32, a water tank, or an off-gas system.

The cathode supply 30 of the fuel cell system 100 shown in FIG. 1 includes a cathode supply path 31 which supplies an oxygen-containing cathode operating resource, in particular air drawn from the environment, to the cathode chambers 13 of the fuel cell stack 10. The cathode supply 30 further comprises a cathode off-gas path 32, which discharges the cathode off-gas (in particular, the exhaust air) from the cathode chambers 13 of the fuel cell stack 10 and, if necessary, feeds it to an off-gas system not shown.

A compressor 33 is arranged in the cathode supply path 31 for conveying and compressing the cathode operating resource. In the implementation example shown, the compressor 33 is designed as a mainly electric-motor-driven compressor 33, which is driven by an electric motor 34 equipped with corresponding power electronics 35.

The fuel cell system 100 shown in FIG. 1 moreover has a humidifier module 39 arranged upstream of the compressor 33 in the cathode supply line 31. On the one hand, the humidifier module 39 is arranged in the cathode supply path 31 so that the cathode off-gas can flow through it. On the other hand, it is arranged in the cathode off-gas path 32 in such a way that the cathode off-gas can flow through it. A humidifier 39 typically has a plurality of water vapor permeable membranes which are either flat or in the form of hollow fibers. The relatively dry cathode operating gas (air) flows over one side of the membranes and the relatively moist cathode off-gas (off-gas) flows over the other side. Driven by the higher partial pressure of water vapor in the cathode off-gas, water vapor is transferred across the membrane into the cathode operating gas, which is humidified in this way.

The fuel cell system 100 moreover has a humidifier bypass 37 connecting together the cathode supply line upstream and downstream of the humidifier 39 with a flap valve arranged therein as a bypass control means 38. Furthermore, flap valves 27.3 and 27.4 are arranged upstream of the fuel cell stack 10 in the anode supply line 31 and downstream of the fuel cell stack 10 in the anode off-gas line 32.

Various other details of the anode and cathode supply lines 20, 30 are not shown in FIG. 1 for reasons of clarity. For example, the anode off-gas line 22 can open into the cathode off-gas line 32, so that the anode off-gas and cathode off-gas are discharged via a common off-gas system.

Figure 2:
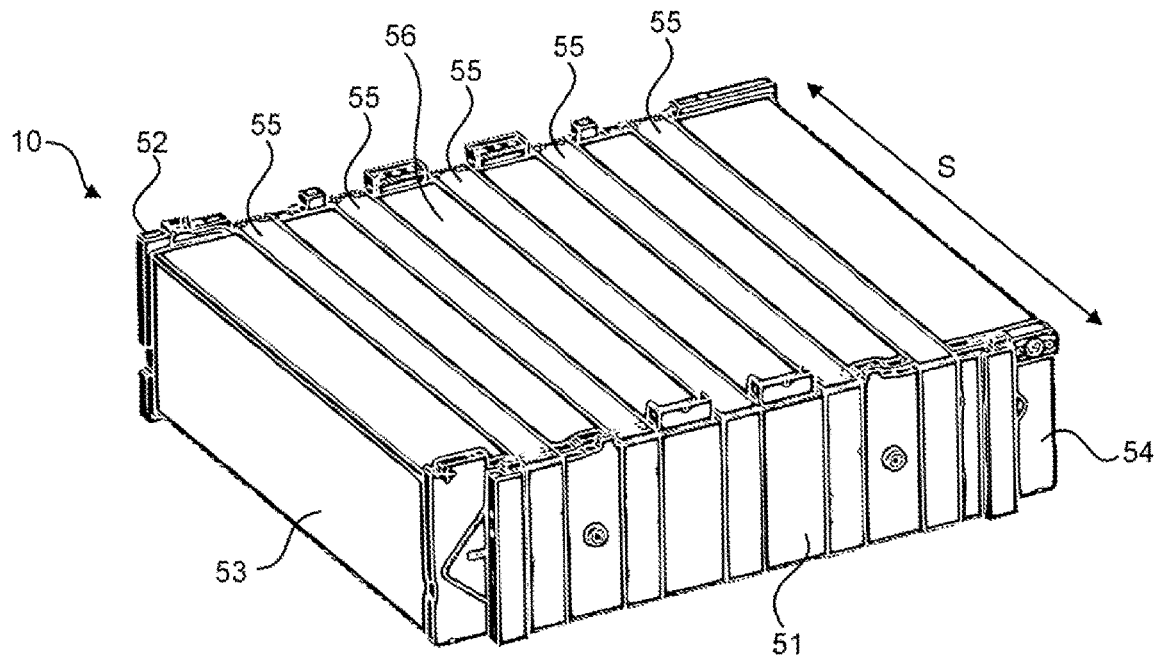
FIG. 2 shows a fuel cell stack with a plurality of tensioning elements compressing the stack.

FIG. 2 shows a view of a fuel cell stack according to the state of the art, which can be arranged in the fuel cell system 100 of FIG. 1. The fuel cell stack 10 has a plurality of fuel cells stacked flat on top of each other in the stack direction S.

In the stack direction S, the fuel cell stack 10 is bounded by a first end plate 51 and a thereto opposite second end plate 52. In a first direction that is transverse to the stack direction S, the fuel cell stack 10 is bounded by side panels 53, 54. In a second direction that is transverse to the first direction and transverse to the stack direction S, the fuel cell stack 10 is bounded by side panel 56.

The fuel cell stack 10 shown in FIG. 2 is compressed by a plurality of five tensioning elements 55 total. Each tensioning element 55 completely runs around a cross-section of the fuel cell stack 10, stretching over the end plates 51, 52 and the side panel 56. The tensioning elements 55 thereby rest against the end plates 51, 52 and the side panel 56. Each tensioning element 55 is welded to itself in an area of the first end plate 51. To compress the fuel cell stack 10, the tensioning elements 55 are welded to themselves while the tensioning element 55 is under tensile stress.

Figure 3:
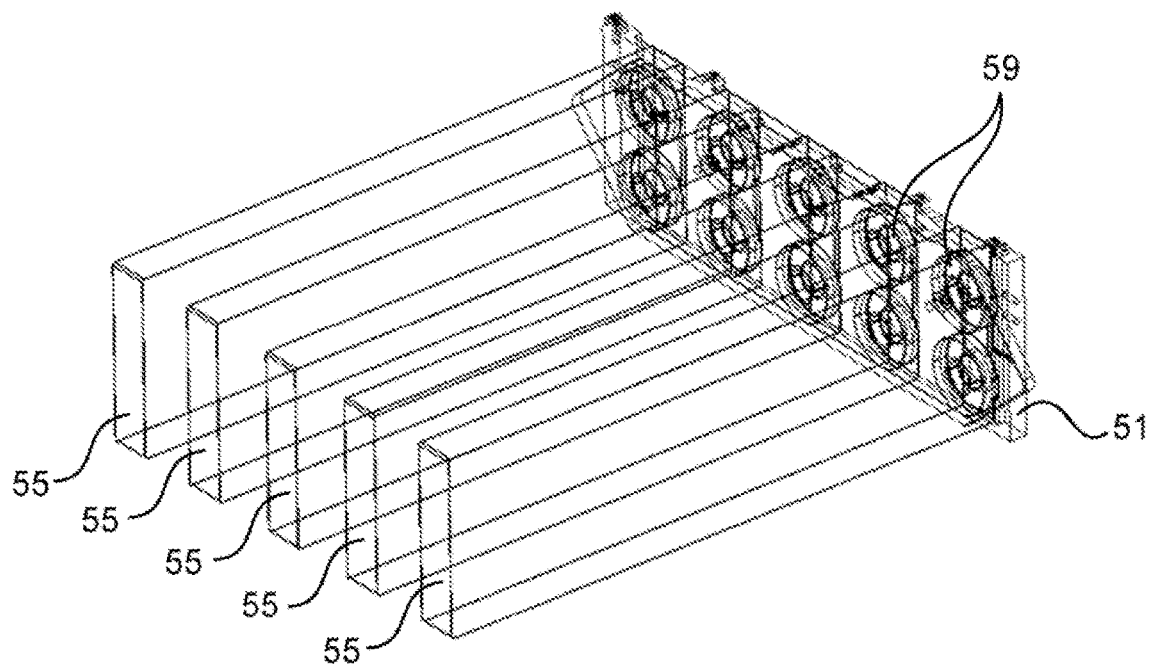
FIG. 3 shows a detailed view of the fuel cell stack of FIG. 2.
Figure 4:
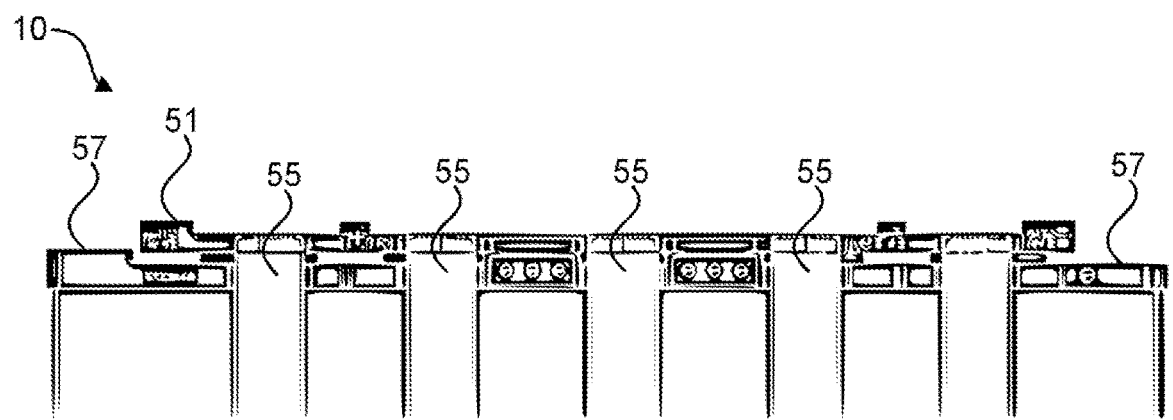
FIG. 4 shows a detailed view of the fuel cell stack of FIG. 2.

It is not possible to retension the tensioning elements 55 in the case of the fuel cell stack 10 as shown in FIG. 2. Instead, as shown in FIG. 3, a plurality of compression springs 59 are arranged between the end plate 51 and a compression plate (not shown) of the fuel cell stack 10 of FIG. 2. If the length of the tensioning elements 55 increases due to aging, this should be compensated by the compression springs 59. The springs 59 are arranged in inwardly pointing recesses in the end plate 51. This means that either additional installation space is required for the springs 59, e.g., by making the end plate 51 thicker, or the end plate 51 must be thinner in the area of the recesses and is therefore less stable. Both variants lead to specific disadvantages of the respective design. As shown in FIG. 4, due to the use of circumferential tensioning elements 55, it is not possible to tension the end plate 51 in the inlet/outlet areas 57 of the fuel cell stack 10, in which the operating resource are supplied or discharged. This results in a disadvantageous bending of the end plates 51 and unequal compression in the state of the art.

Figure 5:
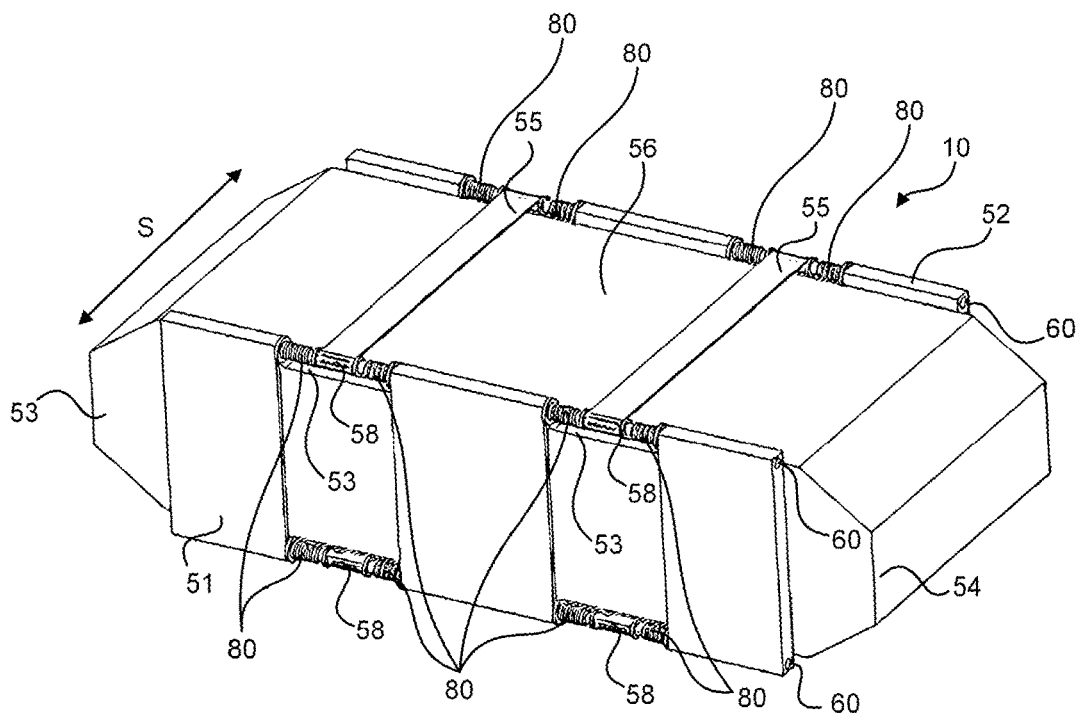
FIG. 5 shows a fuel cell stack according to an embodiment.
Figure 6:
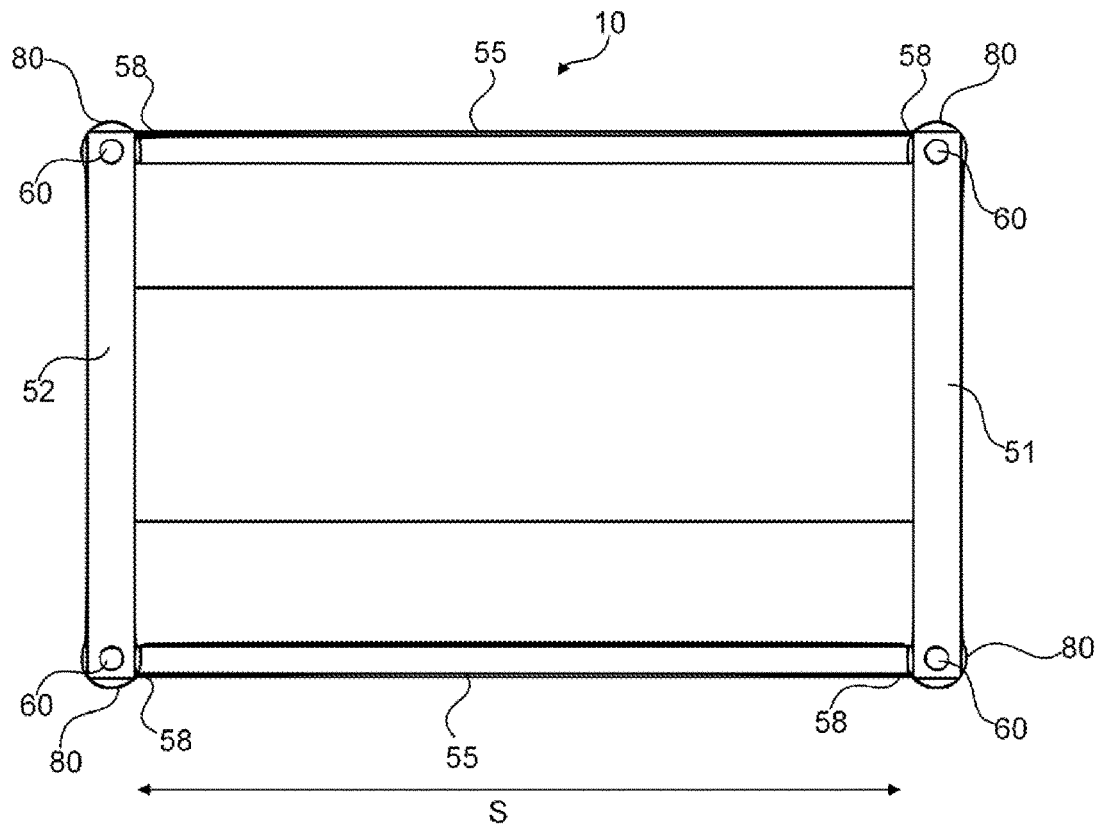
FIG. 6 shows a cross-sectional view of the fuel cell stack of FIG. 5.
Figure 7:
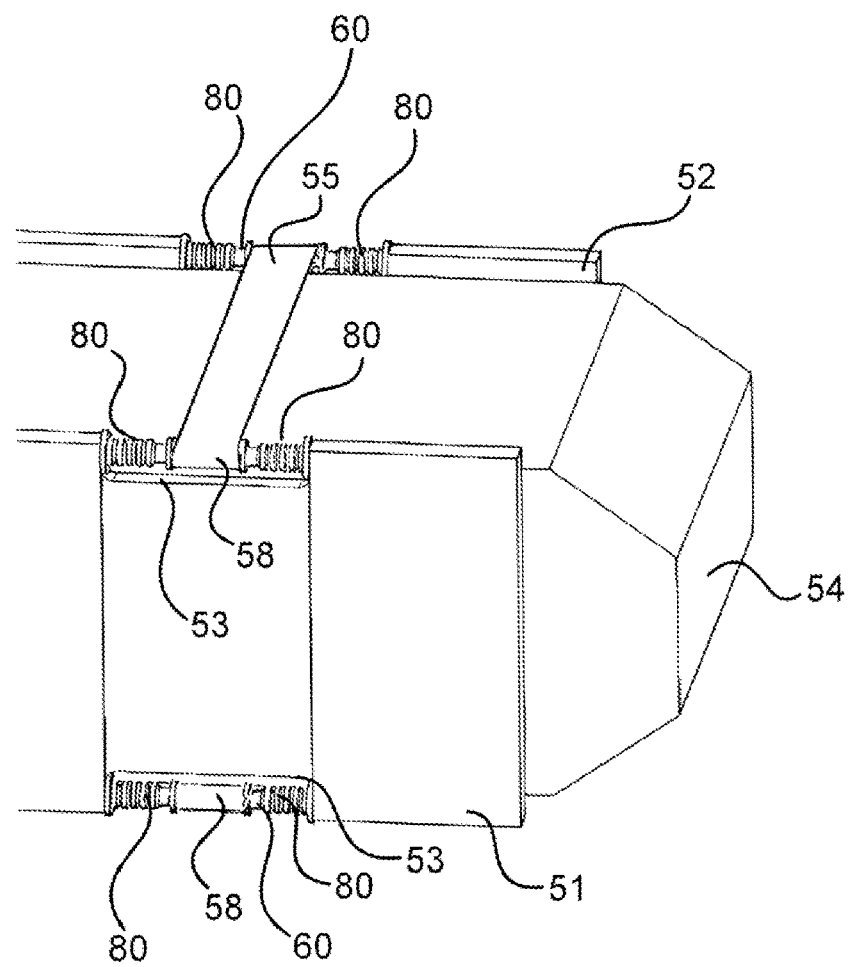
FIG. 7 shows a detailed view of the fuel cell stack of FIG. 5.

FIG. 5 shows a schematic view of a fuel cell stack 10 according to a first embodiment. FIG. 6 shows a cross-sectional view of this fuel cell stack 10 along the stack direction S. FIG. 7 shows a detailed view of the fuel cell stack 10 shown in FIG. 5, which is described below when it differs from the fuel cell stack shown in FIGS. 2 and 3.

The fuel cell stack 10 has a first end plate 51 and an opposite second end plate 52. Each end plate 51, 52 has both a continuous cylindrical cavity in an upper and a lower edge area, which is to say in the area of the transition between the outwardly facing surface of the end plates 51, 52 and an upper or alternatively lower surface perpendicular thereto. Mounting shafts 60 are rotatably mounted in these cavities, for example, by means of suitable bearing shells arranged in the cavities.

Furthermore, the first and second end plates 51, 52 each have two recesses 53 in the upper and lower edge areas. The respective mounting shaft 60 is exposed in the recess. In other words, the end plates 51, 52 have a lesser vertical expansion in the area of the recesses 53 (in relation to the orientation of FIG. 4).

The fuel cell stack 10 has two tensioning elements 55 which are tensioned between the first end plate 51 and the second end plate 52, in particular between an upper edge area of the first end plate 51 and an upper edge area of the second end plate 52. The end sections 58 of these tensioning elements 55 are each fixed to one of the mounting shafts 60. FIG. 4 only explicitly identifies the first end sections 58 that are fixed to the mounting shafts 60 of the first end plate 51. Nevertheless, the tensioning elements 55 have second end sections that are fixed to the mounting shafts 60 in the edge areas of the second end plate 52.

The first end sections 58 are fixed to the mounting shaft 60 in the upper edge area of the first end plate 51 in the area of the recesses 53 of the end plate 51. The second end sections are fixed in the same way in the area of the recesses of the second end plate 52 on the mounting shaft 60. The fuel cell stack 10 has two further tensioning elements tensioned between the lower edge area of the first end plate 51 and the lower edge area of the second end plate 52. Of these, only the first end sections 58 are shown in FIG. 4, which are fixed to the mounting shaft 60 located in the area of recesses 53 of the lower edge area of the first end plate 51.

Through the fixing, which is to say the firm bonding and/or frictional and/or positive fastening of the first end sections 58 and the second end sections of the tensioning elements 55 in the area of the recesses 53 of the end plates 51, 52, the tensioning elements 55 can be wound onto the mounting shafts 60 by rotating them without the end plates 51, 52 hindering this winding.

Within the recesses 53, torsion springs 80 are also fixed to both the mounting shaft 60 and the respective end plates 51, 52. In particular, the torsion springs 80 are welded to the respective mounting shaft 60 and fixed to an inward facing wall of the respective recess 53 by means of a flange (not shown). Each end section 58 of each tensioning element 55 in each recess 53 is surrounded by two torsion springs 80. In this manner, one end section 58 of a tensioning element 55 and two torsion springs 80 are arranged on each section of a mounting shaft 60 exposed within a recess 53.

The torsion springs 80 are tensioned in such a way that a force exerted by the torsion springs 80 on the mounting shaft 60 or a torque exerted on the mounting shaft 60 opposes a force exerted by the tensioning elements on the mounting shaft 60 or a torque exerted on the mounting shaft 60. In this, in particular, a tensioning element 55 that is at least wrapped around the mounting shaft one time transmits torque to it. Due to the rotatable mounting of the mounting shafts 60, there is always a kinematic equilibrium between the torsion springs 80 and the tensioning elements 55. Thus, a decrease in the tensile stress of the tensioning elements 55, due, for example, to a lengthening caused by aging, is compensated by winding the tensioning elements 55 onto the mounting shafts 60, which is brought about by the torque of the torsion springs 80. This ensures that the tensile stress of the tensioning elements 55 and thus the compressive tensile force acting on the stack 10 is maintained even over extended periods of time.

The mounting shafts 60 may each have a longitudinal radial groove (not shown). In other words, a radial groove is provided in the mounting shaft 60 along a longitudinal extension of the mounting shaft 60. The radial groove is designed to accommodate an end section 58 of one or a plurality of tensioning elements 55. The end section 58 is then fixed in the radial groove, for example, with an adhesive. It is also conceivable that the end section 58 has a terminal thickening that corresponds to an internal expansion of the radial groove. The end section 58 of the tensioning element 55 can then be inserted laterally into the mounting shaft 60, which is to say, in the direction of the longitudinal expansion of the shaft 60, and would thus be positively fixed in the radial groove. It is also conceivable that the radial groove could be narrowed after the end section 58 has been inserted, for example, by placing a circlip on the shaft 60. This would result in the end section 58 being positively fixed in the shaft 60.

Figure 8:
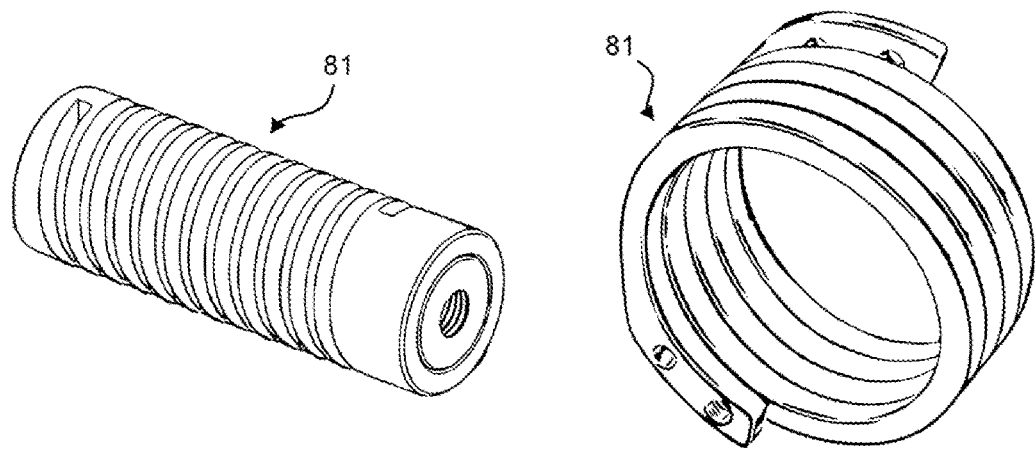
FIG. 8 shows two variants of hollow machined springs.

FIG. 8 shows two embodiments of a torsion spring 80 as hollow machined springs 81. FIG. 8 (A) shows a first torsion spring 80 machined from a hollow cylinder of spring steel. This torsion spring has a female thread with which the torsion spring 80 can be screwed onto a mounting shaft 60, wherein the thread direction brings about a self-locking of the spring 80 on the mounting shaft. In the simplest case, the torsion spring 80 is fixed to the fuel cell stack 10, in particular to an inner wall of the recess 53 of an end plate 51, 52, by means of a frictional connection of the compressed torsion spring 80 to an end plate 51, 52 and a positive connection of a stop lug of the end plate 51, 52 which engages in the recess of the spring 80. FIG. 8 (B) shows a second torsion spring 80 machined from a hollow cylinder made of spring steel. This torsion spring has through holes at both sides at its ends as connecting elements for attachment to the mounting shaft 60 or alternatively to the fuel cell stack 10, in particular an end plate 51, 52. The connecting elements are designed as guides for a safety cotter pin.

Figure 9:
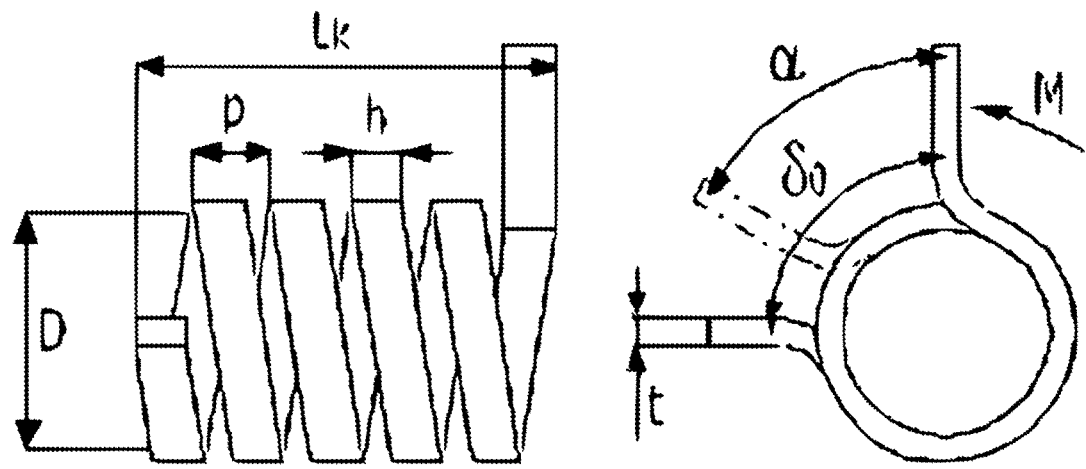
FIG. 9 shows a schematic view of relevant sizes of a torsion spring.

FIG. 9 shows a schematic diagram of a torsion spring 80, as well as the relevant variables related to the torsion spring.

Thereby, c identifies the winding ratio, the dimensionless ratio of the mean diameter of the spring D [mm] and the wire thickness t [mm]. Furthermore, b is the width of the wire [mm], M is the torque exerted by the spring [Nmm], E is the modulus of elasticity of the spring [MPa], k is the torsion spring constant of the spring [Nmm/°], $K_B$ is a dimensionless curvature correction factor, $L_K$ is the active length of the spring [mm], n is the number of active coils, p is the distance between the coils [mm], α is the angular deflection of one end of the spring [°], $\delta_0$ is an angle of rest between the ends of the spring [°], and s is a bending stress of the spring material [MPa].

Using the formulas given in Table 1 for coil springs wound from wire with a rectangular cross-section, it results that 8 springs are sufficient to apply a force of 5000 N, when each spring has an average diameter D=30 mm, ten coils (n=10), a modulus of elasticity E=200 Gpa, a wire width b=10 mm, a wire thickness t=6 mm and an angular deflection of approx. 14°. For the case of a tensioning element 55 that is applying this tensile force, it would therefore be sufficient if on each mounting shaft 60, on each side of the end section 58, there were two such springs which were firmly connected to the mounting shaft 60 and to a fixed point of the fuel cell stack 10 (stationary end). With such a configuration, the 5000 N tensile force of the tensioning element 55 could be guaranteed for an extended period of time.

TABLE 1

$$\alpha = \frac{12 \cdot 180 \cdot M \cdot n \cdot D}{E \cdot b \cdot t^3}$$

$$\sigma = K_b \cdot \frac{6 \cdot M}{b \cdot t^2}$$

$$k = \frac{E \cdot b \cdot t^3}{12 \cdot 180 \cdot n \cdot D}$$

$$K_b \approx \frac{3c - 1}{3c - 3}$$

Figure 10:
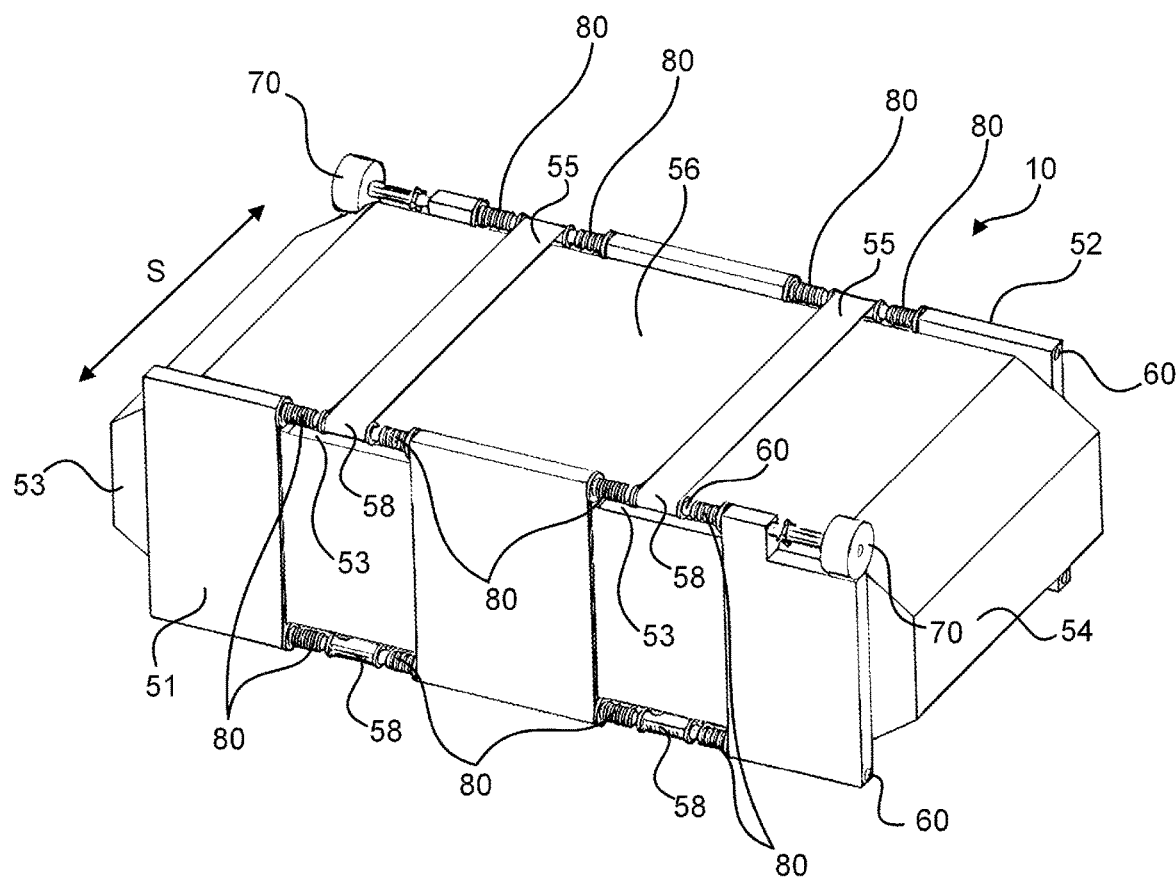
FIG. 10 shows a fuel cell stack according to another embodiment.

A fuel cell stack 10 according to another embodiment is shown in FIG. 10. This embodiment differs from the first embodiment in that each of the mounting shafts 60 for retensioning the torsion springs 80 has an electric motor 70, which is designed for electromotive drive, which is to say designed for rotating the corresponding mounting shaft 60. The electric motors are only shown in FIG. 10 for the mounting shafts 60 of the end plates 51, 52 located in the upper edge areas.

As can be seen from the illustration in FIG. 6 and FIG. 10, retensioning of the torsion springs 80, which are firmly connected to the mounting shafts 60, by rotating the mounting shafts 60 inevitably also results in a winding of the tensioning element 55, which is tensioned between the first end plate 51 and the second end plate 52, onto one of the mounting shafts 60, for example, onto the mounting shaft 60 of the first end plate 51, which is driven by an electric motor 70, and thus inevitably also results in a shortening of the tensioning element 55 in the area between the end sections 58.

The shortening of the tensioning elements 55 increases the tensile stress in the tensioning element 55 and, consequently, the tensile force exerted by the tensioning element and opposing the spring force of the torsion springs 80. At the same time, the spring force exerted by the torsion springs 80 also increases by retensioning the springs 80. In order to effectively retension the torsion springs 80, which is to say to achieve a stronger securing of the tensioning elements, the spring force of the springs 80 should always increase slightly more than the tensile force of the tensioning elements 55 when the mounting shafts 60 are firmly rotated.

The fuel cell stack 10 according to FIG. 10 allows the torsion springs 80 to be retensioned by means of the electric motors 70. In so doing, the retensioning can be carried out evenly by a plurality of electric motors 70. It is likewise advantageous that these electric motors 70 are controlled by a control unit (not shown) which receives sensor values from at least one tensile force sensor (not shown), for example, a strain gauge or a spring force sensor. As a consequence, the electric motors 70 allow an automated feedback adjustment of the tensile stress transmitted to the stack 10 by means of the tensioning elements 55 or the force transmitted to the mounting shafts 60 by means of the torsion springs 80 and thus the tensioning elements 55 fixed therein.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
one first end plate and one second end plate;
a plurality of fuel cells arranged between the end plates;
at least one elastic tensioning element tensioned in a stack direction between the end plates; and
at least one rotationally mounted mounting shaft,
wherein at least one end section of the at least one elastic tensioning element is fixed to the at least one rotationally mounted mounting shaft and the at least one rotationally mounted mounting shaft is connected via at least one tensioned torsion spring to the fuel cell stack.

2. The fuel cell stack according to claim 1, wherein the at least one rotationally mounted mounting shaft runs along one edge area of the first and/or second end plates and is connected with this end plate via the at least one tensioned torsion spring.

3. The fuel cell stack according to claim 1,
wherein the at least one rotationally mounted mounting shaft extends in sections inside an edge area of an end plate,
wherein the edge area has at least one recess, in which the at least one rotationally mounted mounting shaft is exposed, and
wherein the at least one elastic tensioning element and the at least one tensioned torsion spring are connected in the recess to the mounting shaft.

4. The fuel cell stack according to claim 1, wherein a spring force of the at least one tensioned torsion spring is adjustable by rotation of the mounting shaft.

5. The fuel cell stack according to claim 1, wherein the at least one tensioned torsion spring is designed as a coil spring, torsion rod spring, or hollow machined spring.

6. The fuel cell stack according to claim 1, comprising at least one electric motor designed for electromotive drive of the at least one rotationally mounted mounting shaft.

7. The fuel cell stack according to claim 1, comprising at least one sensor which is designed to detect a tensile force exerted by at least one elastic tensioning element and/or a spring force exerted by the at least one tensioned torsion spring.

8. The fuel cell stack according to claim 6, comprising at least one control unit designed to operate the at least one electric motor.

9. The fuel cell stack according to claim 1, wherein the first end plate and/or the second end plate is formed in segments.

10. A vehicle with a fuel cell stack according to claim 1.

11. The fuel cell stack according to claim 7, comprising at least one control unit connected to the at least one sensor.

* * * * *